Patented July 25, 1950

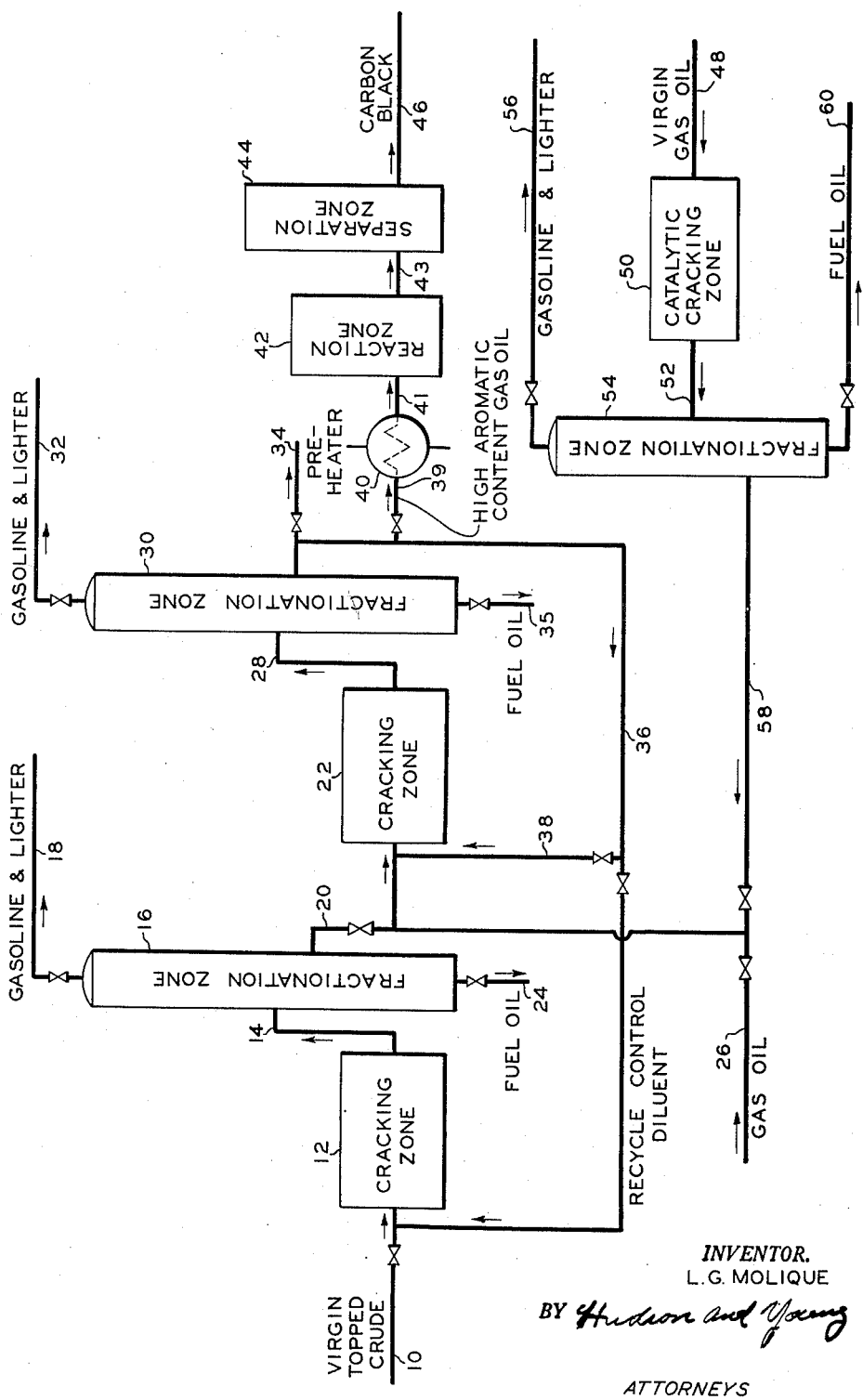

2,516,134

UNITED STATES PATENT OFFICE 2,516,134

METHOD FOR MAKING FEED STOCK FOR A FURNACE BLACK PROCESS

Lawrence G. Molique, Phillips, Tex., assignor to Phillips Petroleum Company, a corporation of Delaware Application December 22, 1947, Serial No. 793,263

5 Claims. (Cl. 23—209.6)

This invention relates to an oil cracking process. In one embodiment it relates to an oil cracking process for the production of high aromatic content gas oil. In one specific embodiment this invention relates to a process for the production of liquid hydrocarbon material for use in the manufacture of carbon black.

At the present time most of the carbon blacks of commerce are produced by very few processes and these blacks may be grouped into classes depending upon the types of rubber compounds and vulcanized rubber which the carbon black will produce. A soft carbon black as compared to a hard carbon black is one which, when mixed in a conventional rubber compound and the compound vulcanized, yields a product which is soft, more resilient, more rubbery and yet tough; whereas a hard carbon black in the same compound imparts stiffer, tougher characteristics with low resilience.

These two types of carbon black may be considered essentially as "limits," and many of the carbon blacks produced will possess hardness properties intermediate these limits.

The commercial "channel" process produces a hard type black which is used with natural rubber for compounding automotive tire tread stocks that withstand abrasion and possess other desirable physical test properties. One serious drawback to the production of "channel" black is that the yield of black is only about 3.5 percent of the carbon content of the gas from which it is made. Some other carbon black producing methods give higher yields of black than the channel process, but in essentially all cases these blacks are of a "soft" type and less desirable for use in tread stocks. Such blacks are usually produced by one or another of the so-called "furnace" processes, and while these blacks are frequently not well-adapted for use in tread stocks even with natural rubber, they possess properties which adapt them to other and varied uses. In pre-war times the relative amount of these furnace blacks produced was small as compared to the amount of the hard channel black. And in addition, most blacks as produced, including "channel" black, are not especially suitable for compounding with synthetic rubbers for tire purposes.

The "channel" black process, though it produces a hard black, is a very wasteful process as only 3.5 percent of the carbon content of the gas (the feed stock to the channel black process is natural gas) is converted into carbon black. So-called "furnace" black uses liquid hydrocarbons and converts a much higher content of the carbon to carbon black than does the channel process. The characteristics of the carbon black produced by the "furnace" type process depends, to a large extent, upon the type of liquid hydrocarbon material used as a charge to the process. It has been found that a low API gravity cracked gas oil having a high aromatic content is very desirable as a feed stock for the "furnace" black process. I have discovered that when a gas oil from a topped crude thermal cracking unit is combined with a gas oil from a catalytic cracking unit and the resulting mixture passed to a second thermal cracking unit and a portion of the resulting gas oil is recycled to said second thermal cracking unit and to said first thermal unit, a high yield of gas oil is obtained which contains a high aromatic content, and therefore possesses a low aniline number and is very desirable for use in manufacturing "furnace" type carbon black.

An object of this invention is to provide an improved oil cracking process.

Another object is to provide an improved oil cracking process for the production of high yield of high aromatic content hydrocarbon materials.

Another object is to produce a highly aromatic gas oil for use as charging stock in the production of carbon black.

Another object is to produce heavy hydrocarbon material, such as gas oil, which has desirable characteristics as a feed stock for the manufacture of carbon black, from low-grade crude oils.

Still other objects and advantages will be apparent to those skilled in the art from a careful study of the accompanying description and disclosure.

In one embodiment of the process of my invention a virgin gas oil or a virgin topped crude oil is cracked in a first thermal cracking unit, and a virgin gas oil is cracked in a catalytic cracking unit. Gas oil is separated from the effluent reaction mixture from each of these cracking units. The gas oil from said first thermal cracking unit and from said catalytic cracking unit are combined and the resulting mixture is passed to a second thermal cracking unit where said gas oil mixture is treated under more severe cracking conditions than in either of the preceding cracking units to produce a highly aromatic gas oil. This highly aromatic gas oil is separated from the reaction mixture effluent from said second thermal cracking unit and a portion thereof is recycled to said second thermal cracking unit, and to said first thermal cracking unit. In each case the recycled oil acts as a diluent for the hydrocarbon material passing to the respective cracking units, thereby permitting higher temperatures to be used in the cracking units, resulting in a decrease in yield of fuel oil and an increase in yield of the desired highly aromatic gas oil. The recycled aromatic gas oil passes through the thermal cracking units substantially unchanged. The gas oil which is not recycled to the thermal cracking units is passed to a "furnace" type carbon black process where it is converted by partial oxidation into carbon black.

The accompanying diagrammatic drawing illustrates one embodiment for carrying out the process of my invention. In discussing this drawing a specific charge stock will be used, and conditions of operations will be given which will serve as an example of my process. It is understood however that my process is not limited to this specific illustration, either as to the flow, the apparatus, charge stock or conditions used.

Referring to the drawing, 200 barrels per hour of a virgin topped crude, having an API gravity of 25°, are passed through line 10 to cracking zone 12, where it is maintained at a temperature of between about 940° and 960° F., and at a pressure between about 300 and about 400 pounds per square inch. The resulting reaction mixture passes through line 14 to fractionation zone 16 which is operated under a pressure of approximately 40 pounds per square inch and at a suitable temperature to remove about 60 barrels per hour of 400° F. end-point gasoline and lighter materials overhead through line 18. Also 610 barrels per hour of 25° API gravity gas oil having an aniline number of 90 are removed through line 20 and passed to cracking zone 22. Also 40 barrels per hour of 10° API gravity fuel oil are removed from fractionation zone 16 through line 24. Two hundred barrels per hour of virgin gas oil having an API gravity of 35° are passed through line 48 to catalytic cracking zone 50, where it is maintained at a temperature of between about 900 and 1000° F. and at a pressure between about 0 and 100 pounds per square inch. Though any of the well-known catalysts cracking processes may be used for the catalytic cracking step of my invention, I prefer to use the type of process referred to as the Cyclo version process described by W. A. Schulze and C. J. Helmers, published in the Oil and Gas Journal, April 13, 1944. The resulting reaction mixture effluent passes through line 52 to fractionation zone 54 which is operated at a pressure of approximately 40 pounds per square inch and at a suitable temperature to remove about 90 barrels per hour 400° F. endpoint gasoline and lighter from the system through line 56. Also, about 100 barrels of 32° API gas oil, having an aniline number of about 140 are removed through line 58 and passed to line 20 where it joins gas oil from fractionation zone 16. The resulting mixture of gas oil, that is the gas oil from zone 16 and zone 54, is passed to a second thermal cracking zone 22. About 10 barrels per hour of fuel oil are removed from fractionation zone 54 through line 60. If desirable, a gas oil from any desirable source may be introduced through lines 26, 58 and 20 to cracking zone 22. However, in this specific example such gas oil is not introduced. The temperature maintained in cracking zone 22 is in the range between about 990° to about 1025° F., and the pressure is maintained in the range between about 900 and 1200 pounds per square inch.

The reaction mixture effluent from cracking zone 22 passes through line 28 to fractionation zone 30 which is maintained at a pressure of approximately 50 pounds per square inch and at a temperature sufficient to remove about 130 barrels per hour of 400° F. end-point gasoline and lighter materials overhead through line 32. Also about 630 barrels per hour of the aromatic gas oil are withdrawn from fractionation zone 30 through line 34 and about 30 barrels per hour of 0° API gravity fuel oil are removed through line 35. At least a portion of the gas oil removed from fractionation zone 30 through line 34 is recycled through lines 36 and 38 to cracking zone 22. In this specific example about 50 barrels per hour of this gas oil is recycled to cracking zone 22. Also in this specific example, about 500 barrels per hour of this gas oil is recycled through lines 36 and 10 to cracking zone 12. This gas oil from fractionation zone 30 has an API gravity of 20° and an aniline number of 50. About 80 barrels per hour of this gas oil from fractionation zone 30 is removed from line 36 and passes through line 39 to a carbon black plant consisting of preheater 40, reaction zone 42 and separation zone 44. The oil may be preheated in preheater 40 to a temperature of about 700° F. and atomized or injected into a preheated gas stream (not shown), the mixture then passing through line 41 to reaction zone 42. The preheated gas stream may be at a temperature of from 1000° to 2400° F., preferably 1800° to 2000° F. It is not necessary that the high aromatic content oil be heated to 700° F. prior to injection into the gas stream, since sufficient sensible heat may be available from the preheated gas to heat and to vaporize the oil prior to its passage into the carbon black producing zone. And further, it is not necessary that all the oil be vaporized in the gas stream since vaporization may be completed in the high temperature reaction zone 42. A hydrocarbon gas and air mixture may be injected tangentially into a cylindrical reaction furnace and burned therein to furnish heat for conversion of the axially added oil and gas to carbon. Air alone may be injected to furnish oxygen and in this latter case, some oil is burned to furnish heat for conversion of the remainder of the oil to carbon. The conversion products may be cooled by passage through an atmospheric cooling passage 43. Such cooling may be supplemented by water spray cooling if desired. After being cooled to a sufficiently low temperature the reaction zone gases carrying carbon black in suspension pass to a separation zone 44 in which carbon black is recovered. This separation zone may be a bag-filter arrangement or an electro-precipitator, both of which filter means are well-known to the art. The carbon black is then removed from the system through passage 46.

In the accompanying diagrammatic drawing, reference to some of the equipment, such as pumps, gages, regulators and the like, which obviously would be necessary to actually operate the process have been intentionally omitted. Only sufficient equipment has been shown to illustrate the process of my invention, and it is intended that no undue limitations be read into this invention by reference to the drawing and the discussion thereof.

The range of operation conditions which may be employed in conducting the process of my invention may vary considerably, depending upon the particular charge stocks and the desired degree of conversion to highly aromatic gas oil.

However, my preferred range of operating conditions are as follows: The maximum temperature to which the charge stock to the first thermal cracking zone is heated will be in the range of from about 800° to about 975° F., while a pressure on the cracking zone is maintained in the range between about 200 and about 500 or more pounds per square inch. The temperature employed in the catalytic cracking zone may vary from about 900 to 1200° F. However I prefer to use a temperature in the range between about 950° and 1050° F. The pressure is usually maintained at about 0 to 100 pounds per square inch; however, higher pressures may be used in some cases. The temperature at which the gas oil is heated in the second thermal cracking zone will be in the range between about 975° to about 1100° F., while a pressure is maintained on the cracking zone in the range between about 800 and about 1500 pounds per square inch. Separation of the products from each of the three cracking zones into gasoline and lighter materials, gas oil and fuel oil, is accomplished at substantially reduced pressures and temperatures relative to those employed in the corresponding cracking zone.

The high aromatic content gas oil produced by the process of my invention, and which I have found to be highly desirable as a feed stock for the manufacture of carbon black in the furnace type process, possesses the following properties:

|  |  | Permissible Limits |
|---|---|---|
| Gravity, API | 18.5 | 16 to 25. |
| Color, N. P. A. | Dark | |
| Carbon Residue | 0.21 | |
| Aniline number | 50 | 40 to 70. |
| A. S. T. M. Distillation: | | |
| I. B. P. °F | 430 | |
| 5% °F | 458 | |
| 10% °F | 462 | |
| 20% °F | 466 | |
| 30% °F | 472 | |
| 40% °F | 476 | |
| 50% °F | 482 | |
| 60% °F | 490 | |
| 70% °F | 502 | |
| 80% °F | 520 | |
| 90% °F | 568 | |
| End Point °F | 654 | 640° to 700° F. |
| Recovery, per cent degrees | 99 | |

While the gas oil having these properties is desirable in the production of carbon black, the properties of the oil may vary somewhat and yet produce suitable carbon black. The approximate permissible specific limits are, for the most part, not especially critical, except that the oil should have a low API gravity (16° to 25° API), a low aniline number (40 to 70), and at the same time have a narrow boiling range and low end point, the latter not substantially higher than about 700° F.

A process and apparatus for the manufacture of carbon black, using the liquid hydrocarbon material produced by the process of my invention, is illustrated in Krejci Patent 2,375,796, which issued May 15, 1945. The gas oil removed from fractionation zone 30 of the drawing is much superior for use in the manufacture of carbon black than the gas oil removed from fractionation zone 16 of the drawing, due to its higher content of aromatics.

It is to be understood that this invention should not be unnecessarily limited to the above discussion and description, and that modifications and variations may be made without departing from the invention or from the scope of the claims.

I claim:

1. A process for cracking hydrocarbon oils, which comprises cracking a virgin gas oil in a first thermal cracking zone maintained at a temperature of about 950° F., and under a pressure in the range between about 300 and about 400 pounds per square inch; separating a gas oil fraction having an aniline number of about 90 and an API gravity of about 25° from the reaction mixture effluent from said first thermal cracking zone; cracking a virgin gas oil in a catalytic cracking zone maintained at a temperature of about 975° F. and under a pressure of about 100 pounds per square inch; separating a gas oil fraction having an aniline point of about 140 and an API gravity of about 32° from the reaction mixture effluent from said catalytic cracking zone; simultaneously passing said gas oil from said first thermal cracking zone and from said catalytic cracking zone to a second thermal cracking zone maintained at a temperature of about 1025° F., and under a pressure in the range between about 1000 and 1400 pounds per square inch; separating a resulting gas oil having an aniline number of about 50, an API gravity of about 20° and an end-point not in excess of 700° F. from a reaction mixture effluent from said second thermal cracking zone; recycling at least a portion of said gas oil to said second thermal cracking zone; recycling at least a portion of said gas oil to said first thermal cracking zone and using at least a portion of said gas oil as feed stock to a carbon black process.

2. A process for cracking hydrocarbon oils, which comprises cracking a virgin topped crude oil in a first thermal cracking zone maintained at a temperature in the range between about 800° and about 975° F. and under a pressure in the range between about 200 and about 500 pounds per square inch; separating a gas oil fraction from a reaction mixture effluent from said first thermal cracking zone; cracking a virgin gas oil in a catalytic cracking zone maintained at a temperature in the range between about 900 and about 1200° F. and under a pressure in the range between about 0 and about 100 pounds per square inch; separating a gas oil fraction from a reaction mixture effluent from said catalytic cracking zone; simultaneously passing said gas oil from said first thermal cracking zone and from said catalytic cracking zone to a second thermal cracking zone maintained at a temperature in the range between about 975° and about 1100° F. and under a pressure in the range between about 800 and 1500 pounds per square inch; separating a gas oil having an aniline number in the range between about 40 and about 70, an API gravity in the range between about 16° and 25° and an end point in the range between about 640° and 700° F. from a reaction mixture effluent from said second thermal cracking zone; recycling at least a portion of said gas oil to said second thermal cracking zone; recycling at least a portion of said gas oil to said first thermal cracking zone, and passing still another portion of said gas oil to an oxidation zone under conditions such that it is converted by partial oxidation to carbon black.

3. A process for cracking hydrocarbon oils, which comprises cracking a virgin gas oil in a first thermal cracking zone maintained at a temperature in the range between about 800° and about 975° F., and under a pressure in the range between about 200 and about 500 pounds per square inch; separating a gas oil fraction from the reaction mixture effluent from said first thermal cracking zone; cracking a virgin gas oil in a catalytic cracking zone maintained at a temperature in the range between about 900 and about 1200° F. and under a pressure in the range between about 0 and about 100 pounds per square inch; separating a gas oil fraction from a reaction mixture effluent from said catalytic cracking zone; simultaneously passing said gas oil from said first thermal cracking zone and from said catalytic cracking zone to a second thermal cracking zone maintained at a temperature in the range between about 975° and about 1100° F., and under a pressure in the range between about 800 and 1500 pounds per square inch; separating a gas oil from a reaction mixture effluent from said second thermal cracking zone; recycling at least a portion of said gas oil to said second thermal cracking zone and recycling at least a portion of said gas oil to said first thermal cracking zone and passing still another portion of said gas oil to a carbon black producing zone under conditions such that it is converted into carbon black.

4. A process for cracking hydrocarbon oils, which comprises cracking a virgin topped crude in a first thermal cracking zone maintained at a temperature in the range between about 800° and about 975° F. and under a pressure in the range between about 200 and about 500 pounds per square inch; separating a gas oil fraction from the reaction mixture effluent from said first thermal cracking zone; cracking a virgin gas oil in a catalytic cracking zone maintained at a temperature in the range between about 900 and about 1200° F. and under a pressure in the range between about 0 and about 100 pounds per square inch; separating a gas oil fraction from a reaction mixture effluent from said catalytic cracking zone; simultaneously passing said gas oil from said first thermal cracking zone and from said catalytic cracking zone to a second thermal cracking zone maintained at a temperature in the range between about 975° and about 1100° F., and under a pressure in the range between about 800 and 1500 pounds per square inch; separating a gas oil from a reaction mixture effluent from said second thermal cracking zone; recycling at least a portion of said gas oil to said second thermal cracking zone and passing at least a portion of said gas oil to a carbon black producing zone under conditions such that it is converted into carbon black.

5. A process for cracking hydrocarbon oils, which comprises cracking a virgin gas oil in a first thermal cracking zone maintained at a temperature of about 950° F., and under a pressure in the range between about 300 and about 400 pounds per square inch; separating a gas oil fraction having an aniline number of about 90 and an API gravity of about 25° from a reaction mixture effluent from said first thermal cracking zone; cracking a virgin gas oil in a catalytic cracking zone maintained at a temperature of about 975° F. and under a pressure of about 100 pounds per square inch; separating a gas oil fraction having an aniline point of about 140 and an API gravity of about 32° from a reaction mixture effluent from said catalytic cracking zone; simultaneously passing said gas oil from said first thermal cracking zone and from said catalytic cracking zone to a second thermal cracking zone maintained at a temperature of about 1025° F., and under a pressure in the range between about 1000 and 1400 pounds per square inch; separating a resulting gas oil having an aniline number of about 50, an API gravity of about 20° and having an initial boiling point of about 430° F., a 50 per cent distillation point of about 482° F., and an end point of about 660° F. from a reaction mixture effluent from said second thermal cracking zone; recycling at least a portion of said gas oil to said second thermal cracking zone; recycling at least a portion of said gas oil to said first thermal cracking zone, and using at least a portion of said gas oil as feed stock to a carbon black process.

LAWRENCE G. MOLIQUE.

REFERENCES CITED

The following references are of record in the file of this patent:

UNITED STATES PATENTS

| Number | Name | Date |
|---|---|---|
| 2,258,633 | Thiele | Oct. 14, 1941 |
| 2,270,071 | McGrew | Jan. 13, 1942 |
| 2,281,338 | Straka | Apr. 28, 1942 |
| 2,345,129 | Kuhn | Mar. 28, 1944 |
| 2,352,755 | McAfee | July 4, 1944 |
| 2,358,150 | Cooke | Sept. 12, 1944 |
| 2,375,796 | Krejci | May 15, 1945 |
| 2,415,530 | Porter | Feb. 11, 1947 |